United States Patent

Marvit et al.

(10) Patent No.: US 8,108,405 B2
(45) Date of Patent: Jan. 31, 2012

(54) REFINING A SEARCH SPACE IN RESPONSE TO USER INPUT

(75) Inventors: David L. Marvit, San Francisco, CA (US); Jawahar Jain, Los Altos, CA (US); Stergios Stergiou, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 650 days.

(21) Appl. No.: 12/243,170

(22) Filed: Oct. 1, 2008

(65) Prior Publication Data

US 2009/0094232 A1   Apr. 9, 2009

Related U.S. Application Data

(60) Provisional application No. 60/977,800, filed on Oct. 5, 2007.

(51) Int. Cl.
  *G06F 7/00* (2006.01)
  *G06F 17/30* (2006.01)
(52) U.S. Cl. ......... 707/749; 707/710; 707/728; 707/731
(58) Field of Classification Search .................. 707/710, 707/728, 731, 749
  See application file for complete search history.

(56) References Cited

U.S. PATENT DOCUMENTS

| | | | |
|---|---|---|---|
| 6,691,108 B2 * | 2/2004 | Li | 707/710 |
| 6,732,086 B2 | 5/2004 | Plow et al. | 707/3 |
| 7,475,072 B1 | 1/2009 | Ershov | 707/6 |
| 7,792,858 B2 * | 9/2010 | Tang et al. | 707/780 |
| 2007/0156757 A1 * | 7/2007 | Tang et al. | 707/104.1 |
| 2008/0208808 A1 * | 8/2008 | Sue et al. | 707/3 |

FOREIGN PATENT DOCUMENTS

CN    1839386 A    8/2004

OTHER PUBLICATIONS

Official Action, Chinese Patent Application No. 200810166176.9, 12 pages, Jul. 26, 2011.
Zhang, Li-xia et al. "Search All Day Long—Google & Search Skills," Journal of Library and Information Sciences in Agriculture, vol. 16, No. 10, Oct. 2004, 4 pages, Oct. 2004.

\* cited by examiner

*Primary Examiner* — Wilson Lee
*Assistant Examiner* — Cheryl M Shechtman
(74) *Attorney, Agent, or Firm* — Baker Botts L.L.P.

(57) ABSTRACT

In one embodiment, a search space of a corpus is searched to yield results. The corpus comprises documents associated with keywords, where each document is associated with at least one keyword indicating at least one theme of the document. One or more keywords are determined to be irrelevant keywords. The search space is refined according to the irrelevant keywords.

18 Claims, 5 Drawing Sheets

|  | $w_1$ DOG | $w_2$ FOREST | $w_3$ TREE | $w_4$ GRAPHICS | $w_5$ COMPUTER |
|---|---|---|---|---|---|
|  |  |  |  |  |  |
| $w_0$ BINARY | 0.003 | 0.005 | 0.037 | 0.021 | 0.066 |
| $w_1$ DOG |  | 0.024 | 0.033 | 0.017 | 0.049 |
| $w_2$ FOREST |  |  | 0.092 | 0.004 | 0.052 |
| $w_3$ TREE |  |  |  | 0.042 | 0.056 |
| $w_4$ GRAPHICS |  |  |  |  | 0.222 |

|  | $w_0$ BINARY | $w_1$ DOG | $w_2$ FOREST | $w_3$ TREE | $w_4$ GRAPHICS | $w_5$ COMPUTER |
|---|---|---|---|---|---|---|
| $w_0$ BINARY | 1 | 0.004 | 0.005 | 0.016 | 0.020 | 0.037 |
| $w_1$ DOG | 0.018 | 1 | 0.022 | 0.026 | 0.016 | 0.047 |
| $w_2$ FOREST | 0.013 | 0.013 | 1 | 0.055 | 0.008 | 0.026 |
| $w_3$ TREE | 0.071 | 0.029 | 0.102 | 1 | 0.034 | 0.060 |
| $w_4$ GRAPHICS | 0.071 | 0.013 | 0.012 | 0.026 | 1 | 0.255 |
| $w_5$ COMPUTER | 0.360 | 0.112 | 0.103 | 0.128 | 0.716 | 1 |

| | WORD 1 | WORD 2 | WORD 3 | [...] | WORD 50,000 |
|---|---|---|---|---|---|
| WORD 1 | ----- | 0.005 | 0.037 | [...] | 0.066 |
| WORD 2 | | ----- | 0.033 | [...] | 0.049 |
| WORD 3 | | | ----- | [...] | 0.052 |
| [...] | | | | ----- | [...] |
| WORD 50,000 | | | | | ----- |
| AVERAGE | AA1 | AA2 | AA3 | [...] | AA50,000 |

REFINING A SEARCH SPACE IN RESPONSE TO USER INPUT

RELATED APPLICATION

This application claims benefit under 35 U.S.C. §119(e) of U.S. Provisional Application Ser. No. 60/977,800, titled "Techniques for Reduction of a Search Space," filed Oct. 5, 2007, by David Marvit et al.

TECHNICAL FIELD

The present invention relates generally to lexicographical analysis and, more particularly, to refining a search space in response to user input.

BACKGROUND

A corpus of data may hold a large amount of information, yet finding relevant information may be difficult. Documents may be tagged to facilitate the search for relevant information. In certain situations, however, known techniques for document tagging are not effective in locating information.

DETAILED DESCRIPTION

Overview

Figure 1:
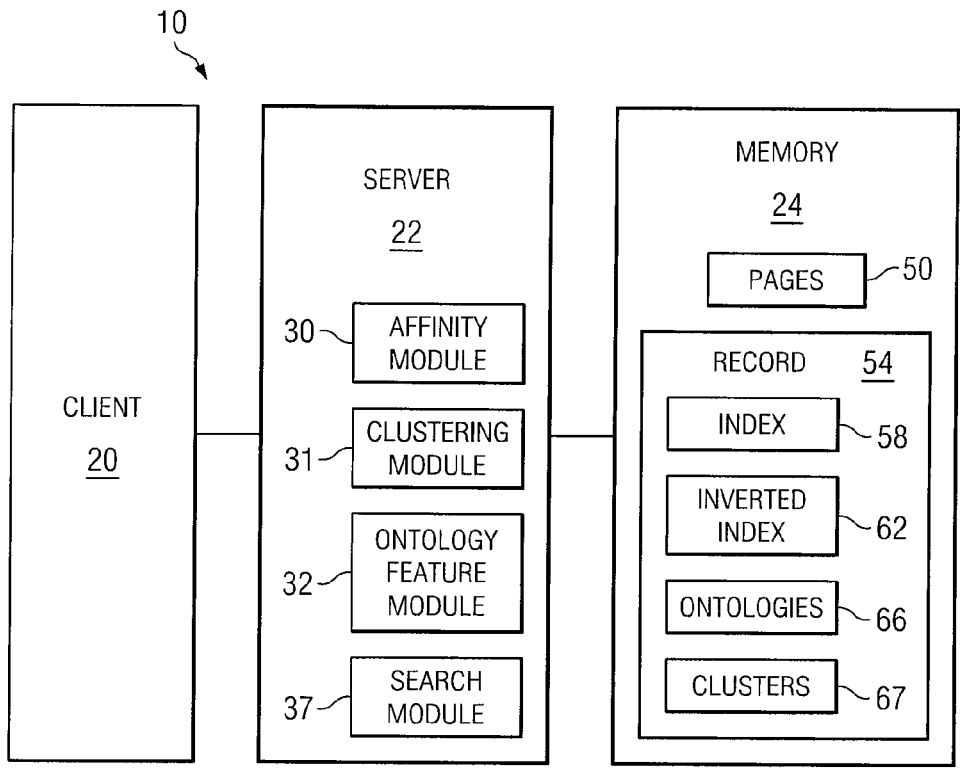
FIG. 1 illustrates one embodiment of a system that refines a search space.

In one embodiment, a search space of a corpus is searched to yield results. The corpus comprises documents associated with keywords, where each document is associated with at least one keyword indicating at least one theme of the document. One or more keywords are determined to be irrelevant keywords. The search space is refined according to the irrelevant keywords.

Example Embodiments

In particular embodiments, creating and querying a domain ontology may include the following:

1. Collect documents in a domain. In particular embodiments, a document is a collection of terms. A document may comprise readable text, for example, a book of the New Testament. A document need not comprise text in narrative form, for example, a document may comprise a set of user-entered tags that individually and collectively describe the content of an image. A collection of documents may be referred to as a "domain corpus."

2. Identify the terms of interest ("dictionary terms") in the domain. Examples of terms include a word (such as "tree"), a phrase (such as "graph algorithm"), a named entity (such as "New York"), etc. A term (or concept) may have different forms. In certain cases, different words are used for the same concept, for example, "kidney stones" and "kidney calculi" refer to the same concept, "kidney stones." In other cases, a word stem may have many inflected variants, for example, the word stem "tree" has inflected variants "tree" and "trees." In particular embodiments, forms of the same term may be treated as mapped to the same term. Any suitable form of a dictionary term may appear in a document, but the particular dictionary term need not appear in any document.

Examples of methods for identifying dictionary terms include using a human-generated dictionary for a specific domain, for example, a medical dictionary. In particular embodiments, a list of dictionary terms may be automatically generated from a set of strings of text in a corpus. The strings may be indexed and sorted by frequency, and strings with frequency above a threshold may be selected. Other suitable statistical method may be used to determine terms. In particular embodiments, "word" may be interchangeable with "term" and "dictionary term."

3. Calculate the number of co-occurrences of dictionary terms in a given co-occurrence context. Two terms co-occur if they each appear at least once within the same co-occurrence context. Examples of co-occurrence contexts include a document and a paragraph.

4. Create a directed weighted graph that comprises the domain ontology. The directed weighted graph includes dictionary terms as the nodes and affinities as the weights of the edges. "Directed weighted graph" may be used as the actual representation of the same information that can be represented by any suitable data structure, e.g., a matrix, a Binary Decision Diagram, or a collection of Binary Decision Diagrams.

5. Apply a procedure to query the directed weighted graph. Given one or more dictionary terms as input, the procedure outputs one or more dictionary terms related to the input dictionary terms. For example, the procedure may outputs a sorted list of one or more terms that have the highest differential directional affinity (described below) towards one or more input terms. In this case, the output includes terms that are more closely related to the input terms, in relation to the domain that the ontology addresses.

Any suitable definitions of affinity may be used. In particular embodiments, the following may be used:

1. Basic Affinity a. The basic affinity (A) between terms A and B may be defined as the ratio of the number of co-occurrence contexts that include both terms A and B over the number of co-occurrence contexts that include either of the terms A or B:

$$A(A,B)=|AB|/|A \text{ or } B|$$

b. The basic affinity (A) between terms A and B may also be defined as the ratio of the number of co-occurrence contexts that include both terms A and B over the maximum of either the number of co-occurrence contexts that include A or the number of co-occurrence contexts that include B:

$$A(A,B)=|AB|/\max(|A|,|B|)$$

2. Directional Affinity

The directional affinity (DAff) between terms A and B may be defined as the conditional probability of observing B, given that A was observed in a co-occurrence context:

$$DAff(A,B)=|AB|/|A|$$

That is, directional affinity may be the number of co-occurrence contexts that include both terms A and B, over the number of co-occurrence contexts that include term A. Generally, DAff(A,B) differs from DAff(B,A).

3. Differential Directional Affinity

The differential directional affinity (DiffDAff) between terms A and B may be defined as the directional affinity between terms A and B minus a factor that accounts for the common-ness of the term B in the corpus. The common-ness of the term B in the corpus may be a statistical value over the basic affinity or directional affinity values of the term B towards the other terms in the corpus. In particular embodiment, the common-ness of the term B in a corpus may be the average affinity (AA) of term B, which yields the following definition of differential directional affinity:

$$DiffDAff(A,B)=DA(A,B)-AA(B)$$

The average affinity (AA), or average directional affinity, of a term B may be defined as:

$$AA(B)=\text{AVERAGE}\_x\, DAff(x,B)$$

That is, average affinity may be the average of the directional affinities of a term B over the other terms in the co-occurrence contexts.

FIG. 1 illustrates one embodiment of a system 10 that refines a search space. In particular embodiments, system 10 searches a search space of a corpus and presents the results along with their associated keywords to a user, where the keywords of a result may indicate the themes of the result. The user may select keywords that are not relevant. System 10 may receive selections of irrelevant keywords and refine the search space according to the irrelevant keywords.

In certain embodiments, directional affinity may be calculated on a specific inverted index II for a given subset of words and a dictionary D, where index II includes, for example, entries $I(w_i)$ and $I(w_j)$ for words $w_i$ and $w_j$. In general, an inverted index is an index data structure that stores mappings from a term to its locations, that is, the co-occurrence contexts in which a term appears. For each pair of words $w_i$ and $w_j$ in D, $DA(i,j)$ may be defined as the values in the conjunction of entries $I(w_i),I(w_j)$ in II divided by the number of values in $I(w_i)$. In general, $DA(i,j)$ is not necessarily equal to $DA(j,i)$. The results may be stored in any suitable manner, for example, row-wise, where the $D(1,i)$ are stored, then the $D(2,j)$ are stored, and so on. For each row i, $|I(w_i)|$ may be stored, followed by the cardinalities of the conjunctions with the $w_j$.

In certain embodiments, directional affinity may be calculated in three phases. In the embodiments, each dictionary term is assigned a unique integer identifier. The entries of an inverted index correspond to the integer identifiers. In Phase 0, the II entries corresponding to D are read. For parameters (s, o), only the element identifiers that are of the form ks+o are kept. The value ks+o defines a subset of the II entries to be examined. In this manner, directional affinities can be computed in parallel. As an example, the result from parameters s,o (1,0) is equivalent to the one obtained from the merging of the computations with parameters (3,0), (3,1), (3,2). This step allows calculation of DA tables for very large inverted indices.

In Phase 1, the conjunctions are calculated row-wise only for $DA(i,j)$. In Phase 2, the calculated upper-triangular UT DA array is read. From that, the lower-triangular part is obtained as the transpose of UT. In certain embodiments, multiple DA arrays of the same dimension may be merged into a single array. A DA array on a large II can be calculated as the $\text{sum}_{i=0 \ldots (s-1)}$ DA with parameters (s, i). Additional information may be stored with the calculated conjunctions so that directional affinities can be computed. In certain cases, the cardinalities of the II entries may be stored.

In certain embodiments, the DA may be stored row-wise, so the calculation of the AA entries may proceed in parallel with the calculation of the DA entries. In particular, AA may be generated by summing up the rows of the DA as they are read from the disk and, at the end, normalized by the number of the dictionary entries.

In the illustrated embodiment, system 10 includes a client 20, a server 22, and a memory 24. Client 20 allows a user to communicate with server 22 to generate ontologies of a language. Client 20 may send user input to server 22, and may provide (for example, display or print) server output to user. Server system 24 manages applications for generating ontologies of a language. Memory 24 stores data used by server system 24.

In the illustrated embodiment, memory 24 stores pages 50 and a record 54. A page 50 (or document or co-occurrence context) may refer to a collection of words. Examples of a page 50 include one or more pages of a document, one or more documents, one or more books, one or more web pages, correspondence (for example, email or instant messages), and/or other collections of words. A page 50 may be identified by a page identifier. A page 50 may be electronically stored in one or more tangible computer-readable media. A page 50 may be associated with any suitable content, for example, text (such as characters, words, and/or numbers), images (such as graphics, photographs, or videos), audio (such as recordings or computer-generated sounds), and/or software programs. In certain embodiments, a set of pages 50 may belong to a corpus. A corpus may be associated with a particular subject matter, community, organization, or other entity.

Record 54 describes pages 50. In the embodiment, record 54 includes an index 58, an inverted index 62, ontologies 66, and clusters 67. Index 58 includes index lists, where an index list for a page 50 indicates the words of the page 50. Inverted index 62 includes inverted index lists, where an inverted index list for a word (or set of words) indicates the pages 50 that include the word (or set of words). In one example, list $W_i$ includes page identifiers of pages 50 that include word $w_i$. List $W_i$ & $W_j$ includes page identifiers of conjunction pages 50 that include both words $w_i$ and $w_j$. List $W_i+W_j$ includes page identifiers of disjunction pages 50 that include either word $w_i$ or $w_j$. $P(W_i)$ is the number of pages 50 of $W_i$, that is, the number of pages 50 that include word $w_i$.

In one embodiment, a list (such as an index list or an inverted index list) may be stored as a binary decision diagram (BDD). In one example, a binary decision diagram $BDD(W_i)$ for set $W_i$ represents the pages 50 that have word $w_i$. The satisfying assignment count $\text{Satisf}(BDD(W_i))$ of a $BDD(W_i)$ yields the number $P(W_i)$ of pages 50 that have word $w_i$:

$$P(W_i)=\text{Satisf}(BDD(W_i))$$

Accordingly, $$P(W_i\ \&\ W_j)=\text{Satisf}(BDD(W_i)\ \text{AND}\ BDD(W_j))$$

$$P(W_i+W_j)=\text{Satisf}(BDD(W_i)\ \text{OR}\ BDD(W_j))$$

Ontologies 66 represent the words of a language and the relationships among the words. In one embodiment, an ontology 66 represents the affinities between words. In the illustrated example, ontologies 66 include an affinity matrix and an affinity graph. Examples of affinity matrices are described with the reference to FIGS. 3 through 5. An example of an affinity graph is described with reference to FIG. 6. Clusters 67 record clusters of words that are related to each other. Clusters are described in more detail with reference to FIG. 7.

In the illustrated embodiment, server 22 includes an affinity module 30, a clustering module 31, an ontology feature module 32, and a search module 37. Affinity module 30 may calculate affinities for word pairs, record the affinities in an affinity matrix, and/or report the affinity matrix. Affinity module 30 may also generate an affinity graph. Affinity module 30 is described in more detail with reference to FIG. 2.

In particular embodiments, clustering module 31 may discover patterns in data sets by identifying clusters of related elements in the data sets. In particular embodiments, clustering module 31 may identify clusters of a set of words (for example, a language or a set of pages 50). In general, words of a cluster are highly related to each other, but not to words outside of the cluster. A cluster of words may designate a theme (or topic) of the set of words. In particular embodiments, clustering module 31 identifies clusters of related words according to the affinities among the words. In the embodiments, words of a cluster are highly affine to each other, but not to words outside of the cluster. Clustering module 31 is described in more detail with reference to FIG. 7.

In particular embodiments, ontology feature module 32 may determine one or more ontology features of a set of one or more words (for example, a particular word or document that include words), and may then apply the ontology features in any of a variety of situations. An ontology feature is a feature of a word set that may place the word set in ontology space of a language. Examples of ontology features include depth and specificity. In particular embodiments, depth may indicate the textual sophistication of a word set. A deeper word set may be more technical and specialized, while a shallower word set may be more common. In particular embodiments, the specificity of a word set is related to the number of themes of the word set. A more specific word set may have fewer themes, while a less specific word set may have more themes.

Ontology feature module 32 may apply the ontology features in any suitable situation. Examples of suitable situations include searching, sorting, or selecting documents according to an ontology feature; reporting the ontology features of a document; and determining the ontology features of documents of one or more users. Ontology feature module 32 is described in more detail with reference to FIG. 8.

In particular embodiments, search module 37 searches a search space of a corpus and presents the results along with their associated keywords to a user, where the keywords of a result may indicate the themes of the result. The user may select keywords that are not relevant. Search module 37 may receive selections of irrelevant keywords, identify keywords that are related to the irrelevant keywords, and refine the search space by removing the irrelevant keywords and the related keywords. Search module 37 is described in more detail with reference to FIG. 9.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. For example, the operations of generators 42 and 46 may be performed by one component, or the operations of affinity calculator 34 may be performed by more than one component. Additionally, operations of system 10 may be performed using any suitable logic comprising software, hardware, and/or other logic. As used in this document, "each" refers to each member of a set or each member of a subset of a set.

Modifications, additions, or omissions may be made to the examples of the matrices without departing from the scope of the invention. A matrix may include more, fewer, or other values. Additionally, the values of the matrix may be arranged in any suitable order.

Figure 2:
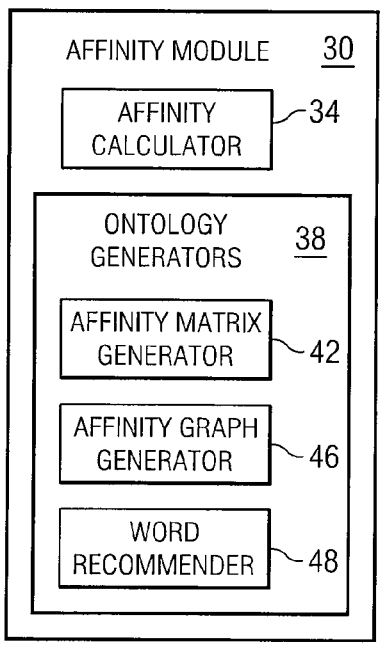
FIG. 2 illustrates one embodiment of an affinity module that may be used with the system of FIG. 1.

FIG. 2 illustrates one embodiment of affinity module 30 that may be used with system 10 of FIG. 1. Affinity module 30 may calculate an affinity for a word pair, record the affinity in an affinity matrix, and/or report the affinity matrix. Affinity module 30 may also generate an affinity graph.

In the illustrated embodiment, affinity module 30 includes an affinity calculator 34, ontology generators 38, and a word recommender 48. Affinity calculator 34 calculates any suitable type of affinity for a word $w_i$ or for a word pair comprising a first word $w_i$ and a second word $w_j$. Examples of affinities include a basic, directional, average, differential, and/or other affinity.

In one embodiment, word recommender 48 receives a seed word and identifies words that have an affinity with the seed word that is greater than a threshold affinity. The threshold affinity may have any suitable value, such as greater than or equal to 0.25, 0.5, 0.75, or 0.95. The threshold affinity may be pre-programmed or user-designated.

A basic affinity may be calculated from the amount (for example, the number) of pages 50 that include words $w_i$ and/or $w_j$. The conjunction page amount represents the amount of pages 50 that include both word $w_i$ and word $w_j$, and the disjunction page amount represents the amount of pages 50 that include either word $w_i$ or word $w_j$. The basic affinity may be given by the conjunction page amount divided by the disjunction page amount. In one example, a number of conjunction pages indicates the number of pages comprising word $w_i$ and word $w_j$, and a number of disjunction pages indicates the number of pages comprising either word $w_i$ or word $w_j$. The basic affinity may be given by the number of conjunction pages divided by the number of disjunction pages:

$$\text{Affinity}(w_i, w_j) = P(W_i \& W_j)/P(W_i + W_j)$$

Figures 3, 4:
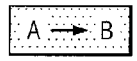
FIG. 3 illustrates an example of an affinity matrix that records basic affinities.
FIG. 4 illustrates an example of an affinity matrix that records directional affinities.

FIG. 3 illustrates an example of an affinity matrix 110 that records basic affinities. In the illustrated example, affinity matrix 110 records the pairwise affinities of words $w_1, \ldots, w_5$. According to affinity matrix 110, the affinity between words $w_0$ and $w_1$ is 0.003, between words $w_0$ and $w_2$ is 0.005, and so on.

Referring back to FIG. 1, an affinity group includes word pairs that have high affinities towards each another, and may be used to capture the relationship between words $w_1$ and $w_2$ with respect to page content. A high affinity may be designated as an affinity over an affinity group threshold. A threshold may be set at any suitable value, such as greater than or equal to 0.50, 0.60, 0.75, 0.90, or 0.95. A word may belong to more than one affinity group. In one embodiment, an affinity group may be represented as a BDD. The pointer for the BDD may be stored with each word of the group in inverted index 62.

A directional affinity may be used to measure the importance of word $w_i$ with respect to word $w_j$. Affinity calculator 34 calculates the directional affinity of word $w_i$ given word $w_j$ from the amount (for example, the number) of pages 50 that include words $w_i$ and $w_j$. A word $w_j$ page amount represents the amount of pages 50 that include word $w_j$. The directional affinity of word $w_i$ given word $w_j$ may be given by the conjunction page amount divided by word $w_j$ page amount. For example, a number of word $w_j$ pages indicates the number of pages 50 that include word $w_j$. The directional affinity of word $w_i$ given word $w_j$ may be given by the number of conjunction pages 50 divided by number of word $w_j$ pages 50:

$$D\text{Affinity}(w_i, w_j) = P(W_i \& W_j)/P(W_i)$$

DAffinity($w_i$, $w_j$) is not the same as DAffinity($w_j$, $w_i$). A high directional affinity DAffinity($w_i$, $w_j$) between words $w_i$ and $w_j$ indicates a higher probability that a page 50 includes word $w_i$ given that the page 50 includes word $w_j$. In one example, pages [1 2 3 4 5 6] include word $w_i$, and pages [4 2] include word $w_j$. The pages that include word $w_j$ also include word $w_i$, so from the viewpoint of word $w_j$, word $w_i$ is of high importance. Only in one-third the pages that include $w_i$ also include word $w_j$, so from the viewpoint of word $w_i$, word $w_j$ is of low importance.

FIG. 4 illustrates an example of an affinity matrix 120 that records the directional affinities for words $w_0, \ldots, w_5$. In the example, words 124 are A words, and words 128 are B words. The rows of matrix 120 record the affinity of a B word given an A word, and the columns of affinity matrix 120 record the affinity of an A word given a B word.

Referring back to FIG. 1, the average affinity of a word $w_i$ calculated with respect to the other words $w_j$. In one embodiment, the average affinity may be the average of the affinities between word $w_i$ and every other word $w_j$. The average affinity of word $w_i$ of N words may be given by:

$$A\text{veAff}(w_i) = \frac{1}{N} \sum_{j=1}^{N} P(w_i \mid w_j)$$

Figures 5, 6:
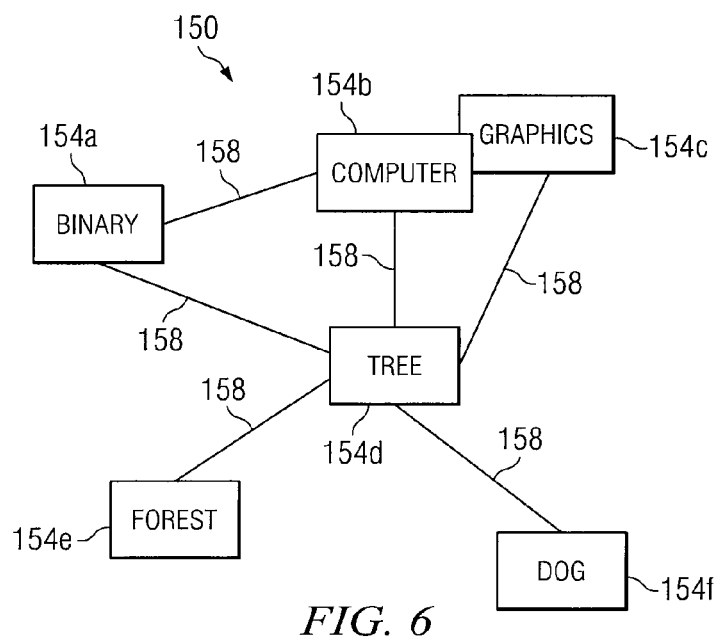
FIG. 5 illustrates an example of an affinity matrix that records average affinities.
FIG. 6 illustrates an example of an affinity graph.

FIG. 5 illustrates an example of an affinity matrix 140 that records average affinities. Rows 142 record basic affinities for word 1 through word 50,000. Row 144 records the average affinities of word 1 through word 50,000.

Referring back to FIG. 1, the average affinity of a word may indicate the depth of the word. A word with a lower average affinity may be regarded as a deeper word, and a word with a higher average affinity may be regarded as a shallower word. Deeper words tend to be more technical, specific, and precise. A page 50 with a higher percentage of deeper words may be regarded as a deeper page, and a page 50 with a lower percentage of deeper words may be regarded as a shallower page. In one embodiment, a user may specify the depth of word and/or pages 50 to be retrieved.

The deeper words of a page 50 may form one or more clusters of highly related words. A cluster may represent a common idea, or theme. The number of themes of a page 50 may indicate the specificity of the page 50. A page 50 with fewer themes may be regarded as more specific, and a page 50 with more themes may be regarded as less specific.

The differential affinity for word $w_i$ with respect to word $w_j$ is the directional affinity between words $w_i$ and $w_j$ minus the average affinity of word $w_j$ for all other words. Differential affinity may be expressed as:

$$\text{DiffAff}(w_i, w_j) = D\text{Affinity}(w_i, w_j) - \text{AveAff}(w_j)$$

Differential affinity removes the bias caused by the general tendency for word $w_j$ to occur in pages 50. In particular circumstances, differential affinity may provide a more accurate indication of the probability that a page includes word $w_i$ given that the page includes word $w_j$.

Differential affinities may be used in a variety of applications. In one example, differential affinities among people's names may be used to study social networking. In another example, differential affinities among language elements may be used to study natural language processing. In another example, differential affinities among products may be used to study marketing.

Affinity calculator 34 may use any suitable technique to search inverted index lists to calculate affinities. For example, to identify pages that include both words $w_i$, and $w_j$, affinity calculator 34 may search list $W_i$ of word $w_i$ and list $W_j$ of word $w_j$ for common elements, that is, common page identifiers.

In particular embodiments, an ontology generator 38 generates an ontology 66 of a language, such as an affinity matrix or an affinity graph. An ontology may be generated from any suitable affinity, such as a basic, directional, average, differential, and/or other affinity. Ontologies 66 may be generated from words selected from a language in any suitable manner. For example, words from a commonly used portion of the language or words related to one or more particular subject matter areas may be selected.

In the illustrated embodiment, ontology generators 38 include an affinity matrix generator 42 and an affinity graph generator 46. Affinity matrix generator 42 generates an affinity matrix that records affinities between words. Affinity graph generator 46 generates an affinity graph that represents affinities between words. In an affinity graph, a node represents a word, and the weight of the directed edge between nodes represents the affinity between the words represented by the nodes. An affinity graph may have any suitable number of dimensions.

FIG. 6 illustrates an example of an affinity graph 150. Affinity graph 150 includes nodes 154 and links 158. A node 154 represents a word. In the example, node 154a represents the word "binary." The weight of the directed edge between nodes between nodes 154 represents the affinity between the words represented by nodes 154. For example, a greater weight represents a greater affinity. A link 158 between the nodes indicates that the affinity between the words represented by the nodes 154 is above an affinity threshold. The affinity threshold may have any suitable value, for example, greater than or equal to 0.25, 0.5, 0.75, or 095.

Figure 7:
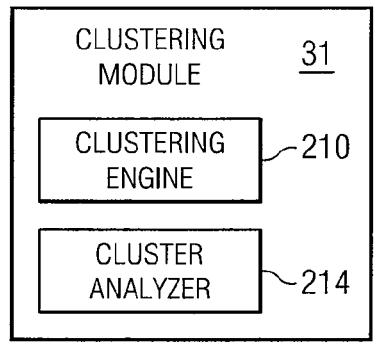
FIG. 7 illustrates one embodiment of a clustering module that may be used with the system of FIG. 1.

FIG. 7 illustrates one embodiment of clustering module 31 that may be used with system 10 of FIG. 1. In particular embodiments, clustering module 31 discovers patterns in data sets by identifying clusters of related elements in the data sets. In particular embodiments, clustering module 31 may identify clusters of a set of words (for example, a language or a set of pages 50). In general, words of a cluster are highly related to each other, but not to words outside of the cluster. A cluster of words may designate a theme (or topic) of the set of words.

In particular embodiments, clustering module 31 identifies clusters of related words according to the affinities among the words. In the embodiments, words of a cluster are highly affine to each other, but not to words outside of the cluster. In one embodiment, words may be regarded as highly affine if they are sufficiently affine. Words may be sufficiently affine if they satisfy one or more affinity criteria (such as thresholds), examples of which are provided below.

Any suitable affinity may be used to identify clusters. In particular embodiments, clustering module 31 uses directional affinity. The directional affinity of a word with respect to other words characterizes the word's co-occurrence. A cluster includes words with similar co-occurrence. In certain embodiments, clustering module 31 uses differential affinity. Differential affinity tends to removes bias caused by the general tendency of a word to occur in pages 50

In the illustrated embodiment, clustering module 31 includes a clustering engine 210 and a clustering analyzer 214. Clustering engine 210 identifies clusters of word according to affinity, and clustering analyzer 214 applies affinity clustering to analyze a variety of situations.

Clustering engine 210 may identify clusters of words according to affinity in any suitable manner. Three examples of methods for identifying clusters are presented: building a cluster from a set of words, sorting words into clusters, and comparing affinity vectors of words. In one embodiment, clustering engine 210 builds a cluster from a set of words. In one example, clustering engine 210 builds a cluster S from a set W of words $\{w_i\}$ with affinities *Aff($w_i$, $w_j$). Affinity value *Aff($w_i$, $w_j$) represents any suitable type of affinity of word $w_i$ with respect to word $w_j$, such as directional affinity DAffinity($w_i$, $w_j$) or differential affinity DiffAff($w_i$, $w_j$). Certain examples of affinity values provided here may be regarded as normalized values. In the example, Aff$_{for}$($w_i$, $w_j$) represents forward affinity, and Aff$_{back}$($w_j$, $w_i$) represents backward affinity.

In the example, cluster S starts with a seed word $w_q$. The current word $w_x$ represents a word of cluster S that is being compared with a word from set W at the current iteration. Initially, current word $w_x$ is set to seed word $w_q$.

During an iteration, current word $w_x$ is set to a word of cluster S. Words $w_i$ of set W are sorted according to their forward affinity Aff$_{for}$($w_i$, $w_x$) with current word $w_x$. Starting at the beginning of the sorted set W, candidate words $w_c$ that meet affinity criteria are identified. The affinity criteria may comprise a forward affinity with the current word $w_x$ criterion:

Aff$_{for}$($w_c$,$w_x$)>Th$_{cf}$ and a backward affinity with the seed word $w_q$ criterion:

Aff$_{back}$($w_q$,$w_c$)>Th$_{cb}$ where Th$_{cf}$ represents a forward threshold for a candidate word, and Th$_{cb}$ represents a backward threshold for a candidate word. The first words of an ordered set of candidate words $\{w_c\}$ are added to the cluster S, the number of added words given by the parameter Size$_c$. Thresholds Th$_{cf}$ and Th$_{cb}$ may be floating point parameters with any suitable values ranging from a minimum value to a maximum value. In certain examples, suitable values of Th$_{cf}$ and Th$_{cb}$ may be determined from a rank-ordered list of actual affinities. For example, the 200$^{th}$ value in the list may be used. Parameter Size$_c$ may be an integer parameter with any suitable value. Examples of suitable values include a default value of 1, 2, 3, or 4. In particular embodiments, the parameters may be varied at certain iterations.

Any suitable number of iterations may be performed. In one example, the number of iterations may be designated prior to initiation of the method. In another example, the number may be calculated during the performance of the method. For example, the number may be calculated from the growth rate of the size of cluster S.

In another embodiment, clustering engine 210, identifies clusters by sorting words of a set of words into clusters. In one example, the words $\{w_i\}$ of set W are sorted according to affinities *Aff($w_i$, $w_j$), such as differential or directional affinities. In another example, the words $\{w_i\}$ are sorted according to an aggregation function, such as the sum, of affinities of word $w_i$ to each member of a distinct set of words Q. Set W may be selected in any suitable manner. For example, set W may be the X words most relevant to a query, where X may have any suitable value, such as a value in the range from 10 to 100, 100 to 200, or 200 or greater.

In the example, the clusters are initially empty. A first word $w_i$ from set W is placed in a cluster. At each iteration, a current word $w_x$ is selected from set W. Current word $w_x$ is placed into a cluster if *Aff($w_x$, $w_f$) satisfies an affinity criterion given by an affinity threshold Th, where $w_f$ represents the first word placed in the cluster. Threshold Th may have any suitable value, for example, a value in the range of 0.1 to 0.5 for a minimum value of 0.0 and a maximum value of 1.0. If *Aff($w_x$, $w_f$) does not satisfy threshold Th, current word $w_x$ is placed into an empty cluster. The iterations are repeated for each word of set W.

After processing the words of set W, small clusters may be eliminated. For example, clusters with less than Y words may be eliminated. Y may have any suitable value, such as a value in a range of 3 to 5, 5 to 10, 10 to 25, 25 to 50, or 50 or greater.

If the number of clusters is not within a satisfactory range, the process may be repeated with a different value of threshold Th that yields a stricter or looser criterion for placement in a cluster. The satisfactory range may be given by a cluster number minimum and a cluster number maximum having any suitable values. Examples of suitable values include values in the range of 1 to 5, 5 to 10, or 10 or greater for the minimum, and values in the range of 10 to 15, 15 to 20, or 20 or greater for the maximum. The value of threshold Th may be increased to increase the number of clusters, and may be decreased to decrease the number of clusters.

In another embodiment, clustering engine 210 identifies clusters by comparing affinity vectors of words. In certain embodiments, the rows and columns of affinity matrix can yield affinity vectors <$w_i$, *Aff($w_i$, $w_j$), . . . , *Aff($w_i$, $w_j$), . . . , *Aff($w_i$, $w_n$)>, which represents the affinity of word $w_i$ with respect to words $w_j$, j=1, . . . , n. Affinity value *Aff($w_i$, $w_j$) represents any suitable type of affinity of word $w_i$ with respect to word $w_j$, for example, directional affinity or differential affinity.

In particular embodiments, affinity vectors with similar affinity values may indicate a cluster. For descriptive purposes only, an affinity vector may be regarded as coordinates of the affinity of a word in affinity space. That is, each affinity value *Aff($w_i$, $w_j$) may be regarded as a coordinate for a particular dimension. Affinity vectors with similar affinity values indicate that the words with which the vectors are associated are close to each other in affinity space. That is, the vectors indicate that the words have similar affinity relationships with other words and thus may be suitable for membership in the same cluster.

Affinity vectors may be similar if one affinity vector is proximate to the other affinity vector as determined by a suitable distance function. The distance function may be defined over the affinity vectors as, for example, the standard Euclidian distance for vectors of the given size, or as the cosine of vectors of the given size. The distance function may be designated by clustering engine 210 or by a user.

In particular embodiments, clustering engine 210 applies a clustering algorithm to identify affinity vectors with values that are proximate to each other. Examples of clustering algorithms include direct, repeated bisection, agglomerative, biased agglomerative, and/or other suitable algorithms. In one example, clustering engine 210 may include clustering software, such as CLUTO.

Clustering analyzer 214 may use affinity clustering for analysis in any suitable application. In one embodiment, clustering analyzer 214 may use affinity clustering to categorize pages 50. A category may be associated with a cluster identifier or one or more members of a cluster. In one example, clusters of a page 50 may identified, and then the page 50 may be categorized according to the clusters. In another example, important words of a page 50 may be selected, and then clusters that include the words may be located. The page 50 may then be categorized according to the located clusters.

In one embodiment, clustering analyzer 214 may use affinity clustering to analyze corpuses of pages 50. A corpus may be associated with a particular subject matter, community of one or more individuals, organization, or other entity. In one example, clustering analyzer 214 may identify clusters of a corpus and determine a corpus character of the corpus from the clusters. The corpus character may indicate the words relevant to the entity associated with the corpus. If one or more pages 50 have clusters of the corpus character, the pages 50 may be relevant to the entity.

In one embodiment, clustering analyzer 214 may use affinity clustering for search query disambiguation and expansion. In the embodiment, clustering analyzer 214 identifies clusters that include the search terms of a given search query. The clusters provide alternate words and/or categories relevant to the given search query. In one example, words from a cluster may be reported to a searcher to help with the next search query. In another example, clustering analyzer 214 may select words from the clusters and automatically form one or more new search queries. Clustering analyzer 214 may run the new queries in serial or parallel.

In one embodiment, clustering analyzer 214 may use affinity clustering to study a social network. In one example, pages 50 may provide insight into a social network. Examples of such pages include correspondence (such as letters, emails, and instant messages), memos, articles, and meeting minutes. These pages 50 may include words comprising user identifiers (such as names) of people of a social network. Clusters of names may be identified to analyze relationships among the people of the network. In one example, differential affinity clustering may be used to filter out names that appear most pages 50 without providing information, such as names of system administrators.

In particular embodiments, clustering analyzer 214 may analyze data sets by combining and/or comparing the clusters of the data sets. In one embodiment, clusters of overlapping data sets are compared. Clusters from one data set may be mapped to clusters of the other data set, which may provide insight into the relationships between the data sets. For example, the data sets may be from an analysis of documents of a group of colleagues and from a social networking study of the group. A social network cluster may be mapped to a document subject matter cluster to analyze a relationship between the social network and the subject matter.

Figure 8:
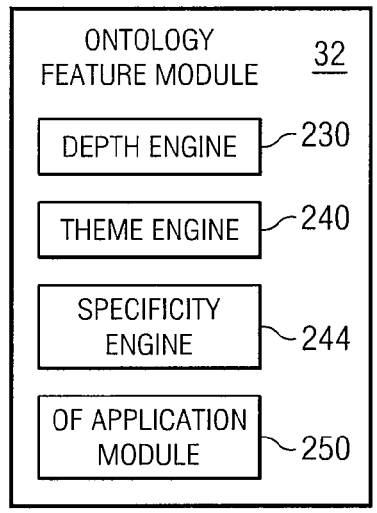
FIG. 8 illustrates one embodiment of an ontology feature module that may be used with the system of FIG. 1.

FIG. 8 illustrates one embodiment of an ontology feature module 32. Ontology feature module 32 may determine one or more ontology features of a set of one or more words (for example, a particular word or document that include words), and may then apply the ontology features in any of a variety of situations. The set of one or more words may include essential terms of a document. A term t may be an essential term if at least one of the top k terms affined to term t is also present in the document. Otherwise, the term may be non-essential to the document.

An ontology feature is a quantifiable measure that characterizes a document along one or more axes of features that may distinguish the document, in a semantic sense, from other documents in a given area. For example, the depth of a document may distinguish the document with respect to its understandability, the specificity of a document may distinguish the document with respect to its focus, and the themes of a document may distinguish the document with respect to its addressed range of topics. An ontology feature can be defined in any suitable manner. For example, independent algorithms in computational linguistics may be used to characterize the readability, or depth, of the document.

In the illustrated embodiment, ontology feature module 32 includes a depth engine 230, a theme engine 240, a specificity engine 244, and an ontology feature (OF) application engine 250. Depth engine 230 may determine the depth of one or more words, for example, a particular word or document that include words. In general, depth may indicate the textual sophistication of words. Deeper words may be more technical and specialized, while shallower words may be more common. In particular embodiments, depth module 32 may calculate the depths of words of a document and then calculate the depth of the document according to the depths of the words. In particular embodiments, depth engine 230 may assign depth values and/or depth rankings to documents and/or words. A deeper document or word may be assigned a higher depth value or ranking, and a shallower document or word may be assigned a lower depth value or ranking.

Depth engine 230 may calculate word depth in any suitable manner. In particular embodiments, depth engine 230 calculates word depth from average affinities. In the embodiments, the depth of a word is a function of the average affinity of the word. A deeper word may have a lower average affinity, while a shallower word may have a higher average affinity. In particular examples, depth engine 230 may calculate the depths of words by ranking the words according to their average affinities. A word with a lower average affinity may be given a higher depth ranking, and a word with a higher average affinity may be given a lower depth ranking.

In particular embodiments, depth engine 230 may calculate word depth using a clustering analysis. In the embodiments, words of a cluster are highly affined to each other, but less so to words outside of the cluster. Distance in cluster space may be measured according to affinity, which may be an indicator of depth. In particular embodiments, words that belong to fewer clusters or to clusters that are smaller and/or farther away from other clusters may be regarded as deeper, and words that belong to more clusters or to clusters that are larger and/or closer to other clusters may be regarded as shallower.

In other particular embodiments, depth engine 230 may calculate word depth by applying a link analysis to an affinity graph 150. The link analysis may be performed by any suitable link analysis algorithm, for example, PAGERANK. For descriptive purposes only, affinity graph 150 of FIG. 6 may be used to calculate word depth. Affinity graph 150 includes nodes 154 and links 158. A node 154 represents a word. A link 158 between nodes 154 indicates that the affinity between the words represented by nodes 154 is above an affinity threshold, that is, the words are satisfactorily affined.

In particular embodiments, depth engine 230 calculates the popularity of nodes 154. A more popular node 154 may represent a shallower word, while a less popular node 154 may represent a deeper word. A link 136 from a first node 154 to a second node 154 is regarded as a popularity vote for the second node 154 by the first node 154. In addition, a vote from a more popular node 154 may have greater weight than a vote from a less popular node 154. Moreover, the affinity of a first node 154 to a second node 154 weights the vote. Depth engine 230 calculates the popularity of nodes 154 from the weighted votes for nodes 154. A less popular word may be regarded as deeper, and a more popular word with may be regarded as shallower.

Depth engine 230 may calculate document depth in any suitable manner. In particular embodiments, depth engine 230 calculates the depth of a document according to the depths of at least one, some, or all words of the document. In certain embodiments, word depth is given by average affinity, so the document depth may be calculated from average affinity of the words of the document. For example, the shallowness of a document may be the average of the average affinity of the words of the document, that is, the sum of the average affinity of each word in document divided by the total number of words in the document. The depth of the document may then be calculated as the inverse of the shallowness of the document.

In particular embodiments, depth may be calculated from the average depth of a selected set of words of the document. The selected set may include the essential words of the document, such as the top (deepest) X % words, where X may be less than 10, 10 to 20, 20 to 30, 30 to 40, 40 to 50, 50 to 60, 60 to 70, or greater than 10. The selected set may exclude P % of the standard grammar words and/or Q % of the stop words, where P and Q have any suitable values, such as less than 10, 10 to 20, 20 to 30, 30 to 40, 40 to 50, 50 to 60, 60 to 70, or greater than 10

In particular embodiments, depth engine 230 calculates the depth of a document according to the distribution of word depth in the document. In particular embodiments, a deeper document may have a higher percentage of deeper words.

In particular embodiments, depth engine 230 calculates the depth of a document according to document affinity. The affinity between documents describe the relationship between the documents. In certain embodiments, the average document affinity may indicate document depth in a manner similar to how the average word affinity may indicate word depth. Document affinity may be defined in any suitable manner. In one example, the number of common words $P(D_1 \& D_2)$ indicates the number of words in both documents $D_1$ and $D_2$, and the number of distinct words $P(D_1+D_2)$ indicates the number of words in either document $D_1$ or $D_2$. Document affinity DocAff between documents $D_1$ and $D_2$ may be defined as:

$$DocAff(D_1,D_2)=P(D_1 \& D_2)/P(D_1+D_2)$$

Depth engine 230 may calculate an average document affinity that in a manner similar to the calculation of average word affinity. A document with a lower average affinity may be regarded as deeper, and a document with a higher average affinity may be regarded as shallower.

In certain embodiments, depth engine 230 may calculate document depth by applying a link analysis to a document affinity graph. A document affinity graph may be similar to affinity graph 150, except that nodes of a document affinity graph represent documents instead of words. Depth engine 230 weights a link from a first node representing a first document to a second node representing a second document with the document affinity of the second document given the first document. The weights of the outgoing links may then be normalized.

In certain embodiments, a depth graph may be displayed on a user interface to show the depths of documents. A depth slider that can be used to select a depth level may also be displayed. In certain embodiments, if a document comprises sections of a larger document, the depth graph can indicate the depths of the sections.

In certain embodiments, depth engine 230 may calculate document depth in any other suitable manner, such as processing histograms of affinities of a document and/or truncating percentages of distinct words based upon depth and then processing the histograms. Other methods include the Gunning-Fog, Flesch, or Fry methods.

In certain embodiments, depth engine 230 may calibrate depth by mapping depth values to particular depth levels. In certain embodiments, depth values in range $R_i$ may be mapped to level $L_i$. For example, $R_0=\{r_0: r_0<c_0\}$ may be mapped to level $L_0$, $R_1=\{r_1: c_0<r_1<c_1\}$ to level $L_1$, . . . , and $R_n=\{r_n: c_n<r_n\}$ to level $L_n$. The ranges may include any suitable depth values and need not be of the same size. There may be any suitable number of levels, such as less than five, five to seven, seven or eight, eight to ten, ten to 20, 20 to 50, 50 to 100, or greater than 100.

Theme engine 240 may determine the themes (or topics) of a document. In particular embodiments, theme engine 240 determines the themes from the clusters of words in the document, which may be identified by clustering module 31. As discussed above, a cluster of words may designate a theme (or topic) of the set of words. The theme of a document may provide useful information about the content of the document. For example, a document that includes the cluster {renal, kidney, protein, problem} is probably about protein leaking from the kidney due to weakening renal functions, rather than the protein content of kidney beans.

In particular embodiments, theme engine 240 determines themes from a theme map. In the embodiments, keywords are extracted from the document using any suitable technique, for example, a term frequency-inverse document frequency (TF-IDF) technique. The keywords are used to select candidate themes from the theme map. The candidate themes are compared to the document to determine how well the themes match the document. In certain examples, a histogram of the candidate themes may be compared to a histogram of the document. If the candidate themes match the document, the themes can provide an estimate of the types and number of themes of the document.

Specificity engine 240 may calculate the specificity of a document. In particular embodiments, specificity engine 240 may assign specificity values and/or specificity rankings to documents. A more specific document may be assigned a higher specificity value or ranking, and a less specific document may be assigned a lower specificity value or ranking.

In particular embodiments, specificity engine 240 calculates the specificity from the number of themes of the document. In certain examples, a more specific document may have fewer themes, and a less specific document may have more themes. In particular embodiments, specificity engine 240 calculates the specificity from the number of themes of the document and the affinity between the themes. In certain examples, a more specific document may have fewer themes with higher affinity between the themes, and a less specific document may have more themes with lower affinity between the themes.

In particular embodiments, the number of themes may be dependent on depth (or level). For example, a single theme at a shallower depth might represent multiple themes at a greater depth. In certain embodiments, the depth may be selected by a user using a depth slider or may be predetermined. In certain embodiments, the level may be selected by a user or may be predetermined. For example, any suitable number of levels may be defined, and the depth may be calculated with respect to the level. For example, the levels may be domain based (for example, engineering, medical, news, sports, or finance domain); specialty based (for example, cardiology, ophthalmology, or nephrology specialty); topic based (for example, hypertension, cholesterol, bypass surgery, or artery-blocks topic); details based (for example, postural hypotension, chronic hypertension, or acute hypertension detail); resolution based (for example, geriatric etiology, medicinal, or genetic resolution); person based (for example, the user query level).

Ontology feature application engine 250 may apply ontology features (such as depth, themes, or specificity) to perform an ontology feature analysis in any suitable situation. Examples of suitable situations include: searching, sorting, recommending, or selecting documents according to an ontology feature; reporting the ontology features of a document; and determining the ontology features of documents (or sets of documents) of one or more users. In particular embodiments, ontology feature application engine 250 may use indices that include information about an ontology feature. In one example, ontology feature application engine 250 uses a document depth (DD) inverted index 62 that is generated and/or maintained according to depth ranking. DD inverted index 62 includes DD inverted index lists, where a DD inverted index list for a word lists document identifiers of documents (or pages 50) that include the word. The document identifier of a document may indicate the depth of the document. For example, the binary encoding used to encode the document identifiers may indicate the depth. In some cases, the DD inverted index lists may list only documents of a satisfactory depth. In another example, ontology feature application engine 250 uses a ranking table and a depth table in addition to inverted index 62. The depth table may indicate the depths of the documents.

In particular embodiments, ontology feature application engine 250 searches for documents with specified values of an ontology feature, such as specified values of document depth or specificity. The specified values may be predetermined, calculated, or selected by a user. In particular embodiments, the values may be selected using a depth slider and/or a specificity slider.

In particular embodiments, ontology feature application engine 250 may use an ontology feature as a sort criterion to sort documents. For example, ontology feature application engine 250 may sort documents according to document depth and/or specificity with respect to themes as well as other sort criteria. In certain examples, ontology feature application engine 250 searches DD inverted index 62 to obtain documents sorted according to document depth. In some examples, ontology feature application engine 250 searches for documents using a non-DD inverted index 62 and then sorts the documents according to depth.

In particular embodiments, ontology feature application engine 250 may graphically display the values of an ontology feature to a client 20. The graphical displays may be provided for some or all documents, for example, for the documents from the top X % of search results. The ontology feature values may be presented in any suitable manner. In some examples, a graphical indicator, such as a number, word, or icon, may indicate a value. The graphical indicator may be placed next to, for example, an item in a list of search results, a headline of an online newspaper, or a document icon. In some examples, modification of existing iconography may indicate the value. For example the size, font, style, color, of text or a graphical indicator may indicate a value. In another example, a graph may indicate the values. An ontology feature histogram may include a document amount axis and a ontology feature axis, and may indicate the amount of documents of particular ontology feature values. For example, a document depth histogram that includes a document amount axis and a document depth axis may indicate the amount of documents of particular document depths.

In particular embodiments, ontology feature application engine 250 may allow a user to request a search for documents that have particular ontology feature values. The user may be allowed to specify values for different words of a query. In certain examples, ontology feature application engine 250 may provide a user with the option to select a depth, and the user may then input the selected depth. The options may be presented in any suitable manner, such as in: (i) absolute terms (for example, a number or a range of numbers representing depth); (ii) relative terms (for example, a portion of search results with respect to depth, such as "deepest X %"); (iii) semantic terms (for example, 'introductory', 'shallow', 'deep', 'very deep', and/or 'highly technical'); (iv) graphical terms (for example, a slider, a button, and/or other graphical element); or (v) any suitable combination of terms (for example, a slider with semantic labels). In some cases, a slider may include a shallow end and a deep end. A user may move the slider toward one end or the other to indicate a selected depth. When the search results are provided, a document depth histogram may appear by the slider, and may use the slider as the document depth axis.

In particular embodiments, ontology feature application engine 250 may calculate an ontology feature character of a set of one or more users. Ontology feature characters may include user depth and user specificity in the context of a theme. The ontology feature character describes the ontology features of documents associated with the user set. For example, a scientist may use deeper documents than a third grader would use. The ontology feature character may be given with respect to one or more themes. For example, a geneticist may use deeper documents in the field of genetics than he would use in the field of poetry. The ontology feature character may be used to determine the expertise of a user, automatically build a résumé for a user, and analyze the social network of a user.

Any suitable documents associated with a user may be analyzed to estimate the ontology feature character, for example, correspondence (such as email and instant messages), web pages, and search history (such as search queries and selected pages). In particular embodiments, ontology feature application engine 250 may track an ontology feature character over time, and may use the past character to predict a future character. In certain examples, ontology feature application engine 250 may assume that a user depth and/or specificity generally increases with time and/or activity in an area.

In particular embodiments, ontology feature application engine 250 may combine certain operations. For example, ontology feature application engine 250 may monitor the depth of a user and then search for documents according to the user depth. In one example, user depth is monitored, and news is provided to the user according to the depth. Future user depth is predicted, and news that fits the predicted user depth is provided.

Figure 9:
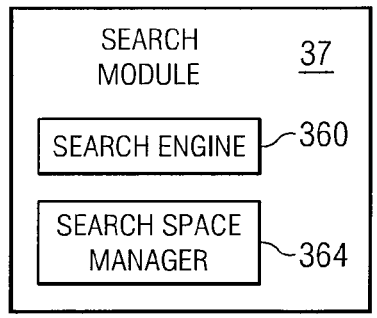
FIG. 9 illustrates one embodiment of a search module that may be used with the system of FIG. 1.

FIG. 9 illustrates one embodiment of a search module 37 that may refine a search space. A search space may be a space from which results of a search may be selected. For example, a corpus (such as the World Wide Web) may include pages (such as web pages or documents). The search space of a corpus may be a subset of the corpus from which results of a search may be selected.

In the illustrated embodiment, search module 37 includes a search engine 360 and a search space manager 364 that may operate according to a Neti Neti approach. In particular embodiments, search engine 360 searches a search space of a corpus and presents the results along with their associated keywords to a user, where the keywords of a result may indicate the themes of the result. The user may select keywords that are not relevant to the search. Search space manager 364 may receive selections of irrelevant keywords according to the irrelevant keywords.

In particular embodiments, search module 37 may filter results from Web feeds, such as RSS (Really Simple Syndication, Resource Description Framework (RDF) Site Summary, or Rich Site Summary) feeds. In the embodiments, a user may provide or select irrelevant keywords to filter the feeds, and search module 37 may offer related words that might also be considered irrelevant.

Search engine 360 and search space manager 364 may use any suitable method to refine a search space. For example, a search query can be mapped to the relevant portion of the ontological space and then the candidate themes that are not possible from the semantic point of view can be eliminated. An example of a method is described with reference to FIG. 10.

Figure 10:
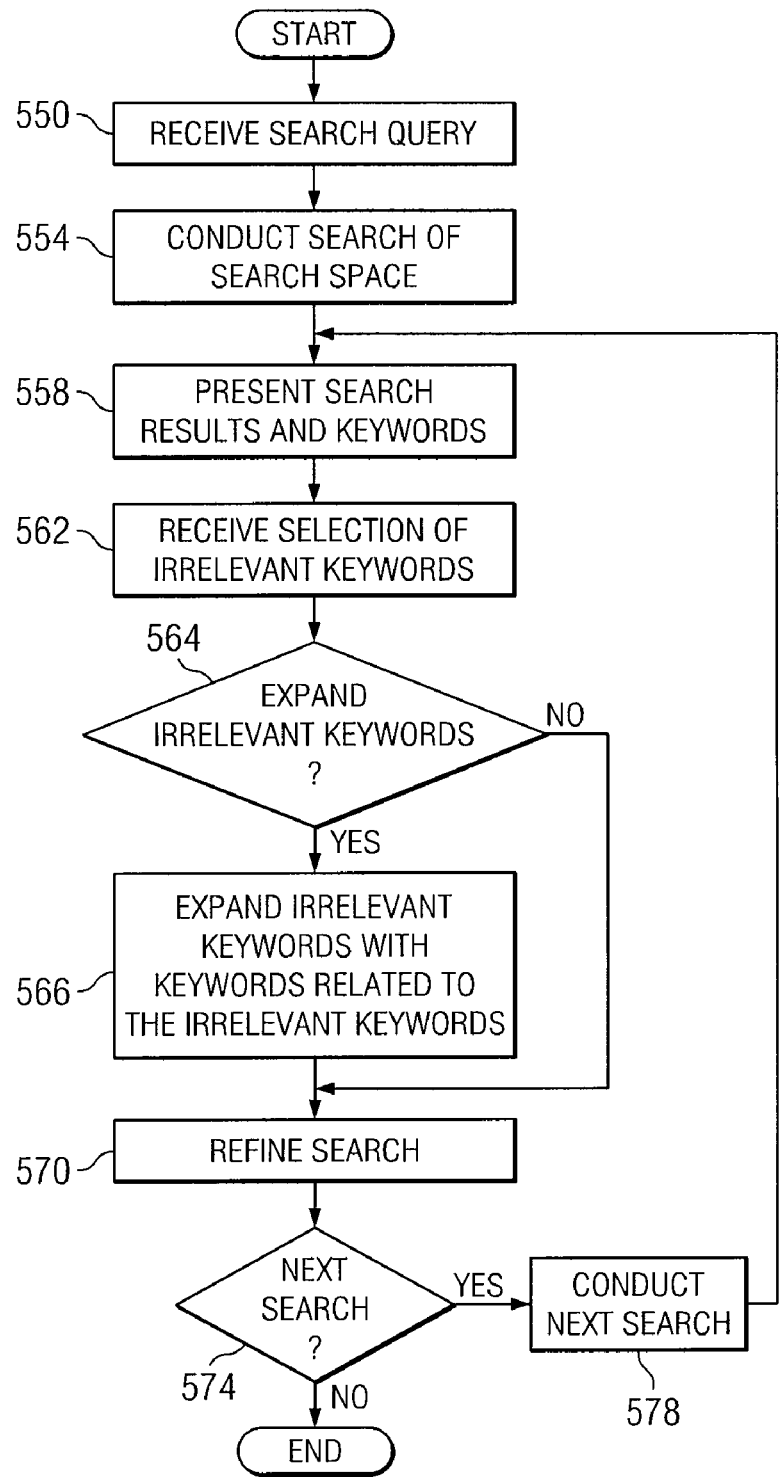
FIG. 10 illustrates an example of a method for refining a search space.

FIG. 10 illustrates an example of a method for refining a search space. The method begins at step 550, where search module 37 receives a search query with search parameters from a user. For example, the search query may include the search term "tree." Search engine 360 conducts a search of the search space at step 554 according to the search parameters. For example, the search may yield results representing a variety of senses of "tree," such as computer science, genealogy, or botany senses.

Search engine 360 presents the results of the search, along with keywords describing the results, to the user at step 558. In particular embodiments, a search result (such as a webpage) may have one or more keywords (such as themes of the document) that describe the result. The results may be presented in any suitable manner. For example, the results may be presented as a list of results and/or their associated keywords. As another example, the results and/or their associated keywords may be presented as an affinity graph (an example of which is illustrated in FIG. 6). As another example, if a cursor is moved over a particular result, then a pop-up window of keywords may be displayed proximate to the result. As another example, a result may have a field proximate to it that expands and displays keywords when clicked. The keywords of a result may be visually proximate to the result.

After one or more iterations of results have been presented, the user may select keywords that are not relevant to the search. For example, the user may select the term "plant" as an irrelevant keyword. An irrelevant keyword may be selected in any suitable manner. For example, the user may place a mark on or near the keyword or may click a keyword.

Search space manager 364 receives selections of irrelevant keywords at step 562. For example, the term "plant" is received. The irrelevant keywords may be expanded at step 574. If the irrelevant keywords are to be expanded, the method proceeds to step 566. If the irrelevant keywords are not to be expanded, the method proceeds directly to step 570.

Search space manager 364 expands the irrelevant keywords at step 566 by adding keywords that are related to the irrelevant keywords to the set of irrelevant keywords. For example, "forest" may be identified as related to "plant," so it may be regarded as an irrelevant keyword.

Relatedness among keywords may be defined in any suitable manner. In particular embodiments, related keywords (or the themes indicated by the keywords) may have a higher affinity to each other than to other keywords (or themes). In one example, related keywords may belong to the same cluster, theme, or topic. In another example, keywords that correspond to the highly affine themes may be regarded as related. In the example, irrelevant themes indicated by the irrelevant keywords are determined, and themes that are highly affine to the irrelevant themes are identified.

Related keywords may be determined using logic. In particular embodiments, implication based logic may be used. For example, given themes X and Y, X→Y. If theme Y is irrelevant, then theme X is also irrelevant. Accordingly, the keyword for theme X may be regarded as related to the keyword for theme Y. Also, since NOT(Y)→NOT(X), then NOT (X) may be used to identify relevant themes.

Logic may be used to represent relationships. In particular embodiments, Boolean values may represent the relationships between themes. As an example, Boolean 0/1/X may be used, where Boolean 0 represents an inverse relationship, Boolean X represents an absence of relationship, and Boolean 1 represents the existence of a relationship. In particular embodiments, fuzzy logic may be used to express ambiguous relationships between themes.

In particular embodiments, certain constraints of refining of the search space may be set in advance, may be specified by a user, or may be automatically generated according to previous user specifications. For example, a user may dynamically tune how much impact that an irrelevant keyword should have on trimming the search space. In some cases, a graphical element (such as a slider) may be moved to specify how loosely or tightly related a keyword should be to an irrelevant keyword before the keyword is used to trim the search space. The method then proceed to step 570.

Search space manager 364 refines the search at step 570. The search may be refined according to the irrelevant keywords in any suitable manner. As an example, the search query may be adjusted by removing the irrelevant keywords, and a new search may be performed with the adjusted search query. As another example, the search space may be reduced by removing the irrelevant keywords from the space. As another example, the search results may be refined by removing the results related to the irrelevant keywords.

A next search may be performed at step 574. If a next search is performed, the method proceeds to step 578, where the search is conducted in the refined search space. The method then returns to step 558, where the search results are presented. If no next search is performed, the method ends.

Modifications, additions, or omissions may be made to the methods without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed:

1. A method comprising:
    searching a search space of a corpus to yield a plurality of results, the corpus comprising a plurality of documents associated with a plurality of keywords, each document associated with at least one keyword indicating at least one theme of the document;
    determining that one or more of the plurality of keywords are irrelevant keywords;
    expanding the irrelevant keywords to include one or more other keywords related to the irrelevant keywords by:
        determining one or more irrelevant themes indicated by the irrelevant keywords;
        identifying one or more affine themes that are highly affine to the irrelevant themes, wherein the affine themes are highly affine if they satisfy an affinity threshold;
        determining one or more affine keywords that correspond to the affine themes; and
        identifying the affine keywords as the keywords related to the irrelevant keywords; and
    refining the search according to the irrelevant keywords.

2. The method of claim 1, further comprising expanding the irrelevant keywords, the irrelevant keywords forming a cluster, to include one or more other keywords related to the irrelevant keywords by:
    selecting one or more keywords that belong to the same cluster as the irrelevant keywords; and
    identifying the selected keywords as the keywords related to the irrelevant keywords.

3. The method of claim 1, further comprising expanding the irrelevant keywords to include one or more other keywords related to the irrelevant keywords by:
    determining one or more irrelevant themes indicated by the irrelevant keywords;
    identifying an implying theme that implies an irrelevant theme;
    determining an implying keyword associated with the implying theme; and
    identifying the implying keyword as a keyword related to the irrelevant keywords.

4. The method of claim 1, further comprising expanding the irrelevant keywords to include one or more other keywords related to the irrelevant keywords by:
    receiving a user selection indicating how loosely or tightly related a keyword should be in order to be identified as a keyword related to an irrelevant keyword; and
    identifying the keywords related to the irrelevant keywords according to the user selection.

5. The method of claim 1, further comprising presenting the results and keywords associated with the results as one of the following:
    a list of the results and the keywords associated with the results;
    an affinity graph of the keywords associated with the results;
    the results, each with a pop-up window of the keywords associated with the results; or
    the result results, each with an expanding field of the keywords associated with the results.

6. The method of claim 1, the refining the search according to the irrelevant keywords further comprising:
    removing the irrelevant keywords from the search.

7. The method of claim 1, the refining the search according to the irrelevant keywords further comprising:
    removing, from the plurality of results that were yielded from the search of the search space of the corpus, results associated with the irrelevant keywords.

8. The method of claim 1:
    the corpus comprising the World Wide Web; and
    the plurality of documents comprising a plurality of web pages.

9. The method of claim 1, the results comprising a plurality of feeds from a Web feed.

10. One or more tangible computer-readable media encoding software operable when executed to:
    search a search space of a corpus to yield a plurality of results, the corpus comprising a plurality of documents associated with a plurality of keywords, each document associated with at least one keyword indicating at least one theme of the document;
    determine that one or more of the plurality of keywords are irrelevant keywords;
    expand the irrelevant keywords to include one or more other keywords related to the irrelevant keywords by:
        determining one or more irrelevant themes indicated by the irrelevant keywords;
        identifying one or more affine themes that are highly affine to the irrelevant themes, wherein the affine themes are highly affine if they satisfy an affinity threshold;
        determining one or more affine keywords that correspond to the affine themes; and
        identifying the affine keywords as the keywords related to the irrelevant keywords; and
    refine the search space according to the irrelevant keywords.

11. The computer-readable media of claim 10, the software further operable to expand the irrelevant keywords, the irrelevant keywords forming a cluster, to include one or more other keywords related to the irrelevant keywords by:
    selecting one or more keywords that belong to the same cluster as the irrelevant keywords; and
    identifying the selected keywords as the keywords related to the irrelevant keywords.

12. The computer-readable media of claim 10, the software further operable to expand the irrelevant keywords to include one or more other keywords related to the irrelevant keywords by:
    determining one or more irrelevant themes indicated by the irrelevant keywords;
    identifying an implying theme that implies an irrelevant theme;
    determining an implying keyword associated with the implying theme; and
    identifying the implying keyword as a keyword related to the irrelevant keywords.

13. The computer-readable media of claim 10, the software further operable to expand the irrelevant keywords to include one or more other keywords related to the irrelevant keywords by:
- receiving a user selection indicating how loosely or tightly related a keyword should be in order to be identified as a keyword related to an irrelevant keyword; and
- identifying the keywords related to the irrelevant keywords according to the user selection.

14. The computer-readable media of claim 10, the software further operable to present the results and keywords associated with the results as one of the following:
- a list of the results and the keywords associated with the results;
- an affinity graph of the keywords associated with the results;
- the results, each with a pop-up window of the keywords associated with the results; or
- the result results, each with an expanding field of the keywords associated with the results.

15. The computer-readable media of claim 10, the software further operable to refine the search according to the irrelevant keywords by:
- removing, from the plurality of results that were yielded from the search of the search space of the corpus, the irrelevant keywords from the search.

16. The computer-readable media of claim 10, the software further operable to refine the search according to the irrelevant keywords by:
- removing results associated with the irrelevant keywords.

17. The computer-readable media of claim 10:
- the corpus comprising the World Wide Web; and
- the plurality of documents comprising a plurality of web pages.

18. The computer-readable media of claim 10, the results comprising a plurality of feeds from a Web feed.

* * * * *